United States Patent
Oohira

(10) Patent No.: US 10,228,581 B2
(45) Date of Patent: Mar. 12, 2019

(54) PORTABLE DEVICE AND METHOD OF MANUFACTURING A DISPLAY DEVICE

(71) Applicants: JAPAN DISPLAY INC., Tokyo (JP); PANASONIC LIQUID CRYSTAL DISPLAY CO., LTD., Himeji-Shi, Hyogo-Ken (JP)

(72) Inventor: Eiji Oohira, Mobara (JP)

(73) Assignees: Japan Display Inc., Tokyo (JP); Panasonic Liquid Crystal Display Co., Ltd., Himeji-shi (JP)

( * ) Notice: Subject to any disclaimer, the term of this patent is extended or adjusted under 35 U.S.C. 154(b) by 0 days.

(21) Appl. No.: 15/879,550

(22) Filed: Jan. 25, 2018

(65) Prior Publication Data

US 2018/0149899 A1 May 31, 2018

Related U.S. Application Data

(63) Continuation of application No. 15/428,546, filed on Feb. 9, 2017, now Pat. No. 9,921,424, which is a (Continued)

(30) Foreign Application Priority Data

Jul. 31, 2008 (JP) .................................. 2008-197213

(51) Int. Cl.
*G06F 3/041* (2006.01)
*G02F 1/1333* (2006.01)
(Continued)

(52) U.S. Cl.
CPC ........ *G02F 1/13338* (2013.01); *G02F 1/1339* (2013.01); *G02F 1/1345* (2013.01);
(Continued)

(58) Field of Classification Search
CPC .. G02F 1/13338; G02F 1/13339; G06F 3/041; G06F 3/0416; G06F 3/044
(Continued)

(56) References Cited

U.S. PATENT DOCUMENTS 5,508,830 A * 4/1996 Imoto ............... G02F 1/133382
349/5
5,841,501 A 11/1998 Eiraku et al.
(Continued)

FOREIGN PATENT DOCUMENTS

| JP | 9-251159 A | 9/1997 |
| JP | 2008-083491 A | 4/2008 |
| JP | 2008-197218 A | 8/2008 |

OTHER PUBLICATIONS

Office Action mailed by Japanese Patent Office dated Oct. 29, 2013 regarding a counterpart Japanese patent application No. 2012-271345.

*Primary Examiner* — Calvin C Ma
(74) *Attorney, Agent, or Firm* — TYPHA IP LLC

(57) ABSTRACT

A portable device and method of manufacturing a display device includes a display panel having a glass substrate and a polarizer adhered to the glass substrate, a touch panel which is made of resin material and adhered to the polarizer of the display panel by a first adhesive material, and a front window which is made of glass and adhered to the touch panel by a second adhesive material. One of the first adhesive material and the second adhesive material is an adhesive sheet, and an other of the first adhesive material and the second adhesive material is an ultraviolet-curing adhesive material.

16 Claims, 11 Drawing Sheets

Related U.S. Application Data continuation of application No. 15/212,395, filed on Jul. 18, 2016, now Pat. No. 9,606,391, which is a continuation of application No. 14/687,719, filed on Apr. 15, 2015, now Pat. No. 9,423,904, which is a continuation of application No. 13/603,847, filed on Sep. 5, 2012, now Pat. No. 9,035,893, which is a continuation of application No. 12/511,151, filed on Jul. 29, 2009, now abandoned.

(51) Int. Cl.
*G06F 3/044* (2006.01)
*G02F 1/1335* (2006.01)
*G02F 1/1339* (2006.01)
*G02F 1/1343* (2006.01)
*G02F 1/1345* (2006.01)

(52) U.S. Cl.
CPC .... *G02F 1/13439* (2013.01); *G02F 1/133528* (2013.01); *G02F 1/134363* (2013.01); *G06F 3/044* (2013.01); *G06F 3/0412* (2013.01); *G02F 1/13452* (2013.01); *G02F 2001/13332* (2013.01); *G02F 2001/133531* (2013.01); *G02F 2202/28* (2013.01); *G06F 2203/04103* (2013.01); *Y10T 156/10* (2015.01)

(58) Field of Classification Search
USPC ............................ 345/173, 174; 349/12, 187
See application file for complete search history.

(56) References Cited

U.S. PATENT DOCUMENTS

| | | | |
|---|---|---|---|
| 6,016,134 A | 1/2000 | Ota | |
| 6,562,659 B1* | 5/2003 | Izumi | ............................ 438/106 |
| 6,771,327 B2* | 8/2004 | Sekiguchi | ........... G02F 1/13338 |
| | | | 345/104 |
| 7,212,270 B2 | 5/2007 | Takatori et al. | |
| 7,561,216 B2 | 7/2009 | Baier | |
| 7,583,326 B2 | 9/2009 | Cho et al. | |
| 7,936,338 B2 | 5/2011 | Iwase | |
| 9,035,893 B2 | 5/2015 | Oohira | |
| 9,606,391 B2 | 3/2017 | Oohira | |
| 2001/0020985 A1* | 9/2001 | Hinata | .................. G06F 3/0412 |
| | | | 349/12 |
| 2003/0128323 A1 | 7/2003 | Matsumoto | |
| 2005/0099402 A1 | 5/2005 | Nakanishi et al. | |
| 2005/0225544 A1 | 10/2005 | Ishibashi | |
| 2006/0262236 A1 | 11/2006 | Abileah | |

* cited by examiner

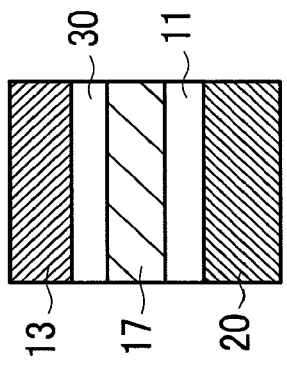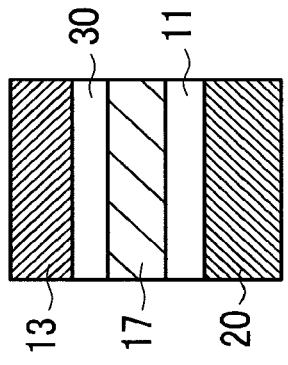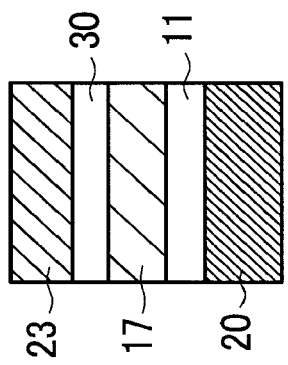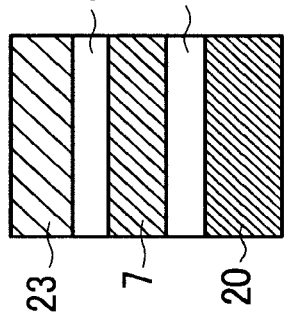

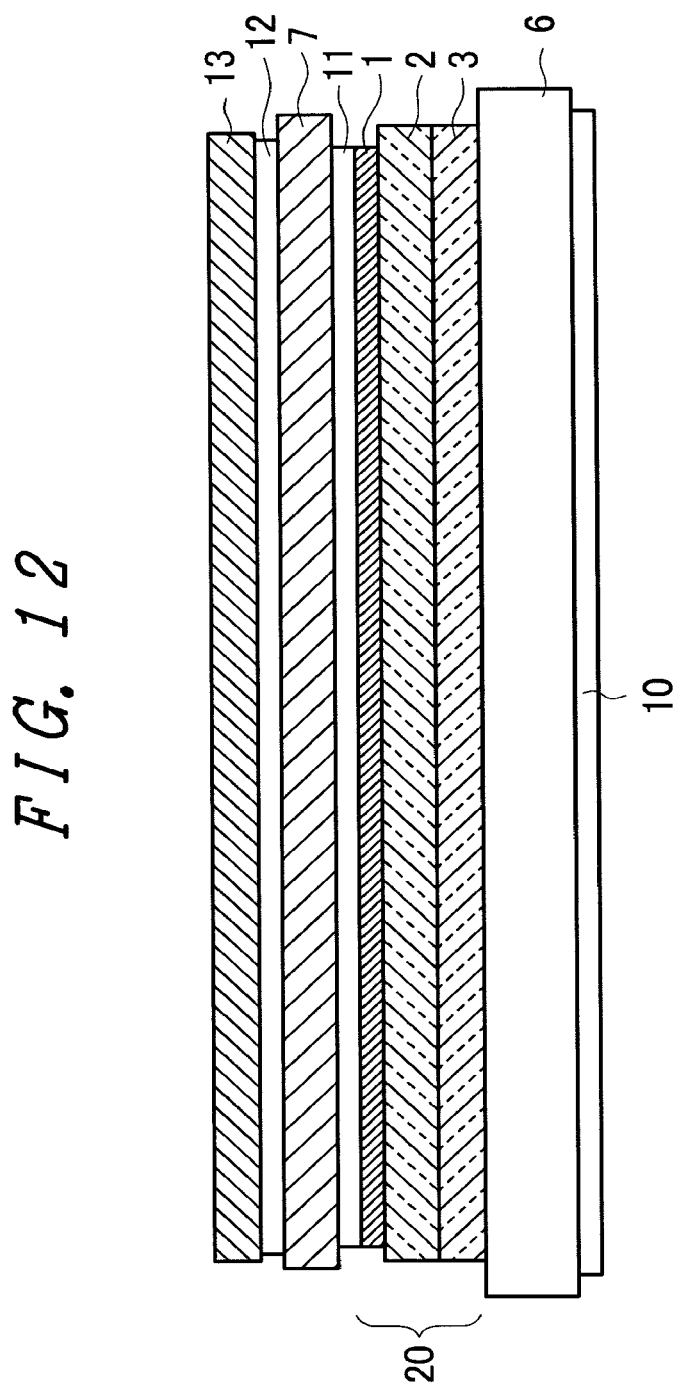

PORTABLE DEVICE AND METHOD OF MANUFACTURING A DISPLAY DEVICE

CROSS-REFERENCE TO RELATED APPLICATIONS

This application is a continuation of U.S. application Ser. No. 15/428,546, filed on Feb. 9, 2017, which, in turn, is a continuation of U.S. application Ser. No. 15/212,395, filed on Jul. 18, 2016 (now, U.S. Pat. No. 9,606,391), which, in turn, is a continuation of U.S. application Ser. No. 14/687,719, filed on Apr. 15, 2015 (now, U.S. Pat. No. 9,423,904), which, in turn, is a continuation of U.S. application Ser. No. 13/603,847, filed on Sep. 5, 2012 (now, U.S. Pat. No. 9,035,893), which is a continuation application of U.S. application Ser. No. 12/511,151, filed Jul. 29, 2009, which claims priority from Japanese Application 2008-197213 filed on Jul. 31, 2008, the entire contents of which are hereby incorporated by reference into this application.

BACKGROUND OF THE INVENTION

1. Field of the Invention

The present invention relates to a liquid crystal display.

2. Related Art

With respect to portable devices such as a mobile phone, a portable gaming machine, a digital camera and a PDA (Personal Digital Assistant), there has been known a portable device which adopts a liquid crystal display formed by stacking a liquid crystal panel, a touch panel and a front window. Such a liquid crystal display has the structure in which the liquid crystal panel and the touch panel are adhered to each other using an adhesive material, and the touch panel and the front window are adhered to each other using an adhesive material (hereinafter referred to as three-layered hybrid structure).

Here, the constitution of a mobile-phone-use liquid crystal display module which constitutes one example of a liquid crystal display of the related art having the three-layered hybrid structure is explained in conjunction with FIG. 5 to FIG. 12.

FIG. 5 is a view showing a mobile-phone-use liquid crystal display module of the related art in a state where a polarizer 1 is exposed (a state before a touch panel 7 and a front window 9 are adhered to each other). FIG. 6 is a view showing a state in which the touch panel 7 is adhered to the polarizer 1 shown in FIG. 5 (a state before the front window 9 is adhered). FIG. 7 is a top plan view of the mobile-phone-use liquid crystal display module shown in FIG. 6 which has the three-layered hybrid structure in which the front window 9 is further adhered to the touch panel 7. FIG. 8 is a cross-sectional view of the mobile-phone-use liquid crystal display module shown in FIG. 6 taken along a line VIII-VIII. FIG. 9 is a cross-sectional view of the mobile-phone-use liquid crystal display module shown in FIG. 6 taken along a line IX-IX.

As shown in FIG. 5 to FIG. 9, the mobile-phone-use liquid crystal display module of the related art includes a liquid crystal panel 20 which is constituted of glass substrates 2, 3 with a liquid crystal layer not shown in the drawing sandwiched therebetween and the polarizer 1 arranged on the glass substrate 2, a semiconductor chip 4 which is mounted on the glass substrate 3, a liquid-crystal-panel-use FPC (Flexible Printed Circuit) 5 which is electrically connected to the semiconductor chip 4, a resin mold 6 which supports the liquid crystal panel 20, a reflection sheet 10, the electrostatic-capacitance-type touch panel 7 which is adhered to the polarizer 1 by way of an adhesive layer (ultraviolet-curing adhesive material) 11 and is larger than the polarizer 1 in size, a touch-panel-use FPC 8, and the front window 9 which is adhered to the touch panel 7 by way of an adhesive layer (ultraviolet-curing adhesive material) 12 and is larger than the touch panel 7 in size.

FIG. 10 is a top plan view of another mobile-phone-use liquid crystal display module of the related art having the three-layered hybrid structure. FIG. 11 is a cross-sectional view of the mobile-phone-use liquid crystal display module shown in FIG. 10 taken along a line XI-XI. FIG. 12 is a cross-sectional view of the mobile-phone-use liquid crystal display module shown in FIG. 10 taken along a line XII-XII. The mobile-phone-use liquid crystal display module shown in FIG. 10 to FIG. 12 has the same constitution as the mobile-phone-use liquid crystal display module shown in FIG. 7 to FIG. 9 except for that the mobile-phone-use liquid crystal display module shown in FIG. 10 to FIG. 12 includes a front window 13 having a size substantially equal to a size of the polarizer 1.

SUMMARY OF THE INVENTION

However, the above-mentioned liquid crystal displays of the related art have a plurality of following drawbacks. Here, such drawbacks of the related art are explained by taking the mobile-phone-use liquid crystal display module shown in FIG. 10 to FIG. 12 as an example.

(1) In the mobile-phone use liquid crystal display module of the related art, as shown in FIG. 13A, the rigid liquid crystal panel 20 and the rigid touch panel 7 are adhered to each other using the ultraviolet-curing adhesive material 11, and the rigid touch panel 7 and the rigid front window 13 are adhered to each other using the ultraviolet-curing adhesive material 12. However, the ultraviolet-curing adhesive materials 11, 12 do not have a sufficient adhesive strength for adhering an elastic layer to the rigid layer before the radiation of ultraviolet rays while straightening the elastic layer having a warp. Accordingly, as shown in FIG. 13B, when the ultraviolet-curing adhesive materials 11, 12 are used as a material for adhering a front window 23 made of an elastic material such as an acrylic resin which is liable to easily warp and the rigid touch panel 7, there exists a possibility that the front window 23 is not reliably adhered to the touch panel 7.

(2) The semiconductor chip 4 is liable to be easily cracked or broken due to an impact generated when a mobile phone falls or the like. To prevent the occurrence of such cracks or breaking, a thickness of the semiconductor chip 4 may be increased as much as possible. However, to consider a case where the thickness of the semiconductor chip 4 is excessively large, when the touch panel 7 projects or overhangs above the semiconductor chip 4 (see FIG. 11), there exists a possibility that the touch panel 7 which is adhered to the liquid crystal panel 20 in an inclined manner with respect to the liquid crystal panel 20 and the semiconductor chip 4 are brought into contact with each other as shown in FIG. 14.

(3) Further, when the touch panel 7 projects or overhangs above the semiconductor chip 4 (see FIG. 11), due to the application of pressure to an edge portion of the front window 9, the generation of the instantaneous deflection of the front window 9 or the like, as shown in FIG. 15, there exists a possibility that one edge of the touch panel 7 (semiconductor-chip-4-side edge) bumps into an upper surface of the semiconductor chip 4 so that the semiconductor chip 4 is broken.

(4) when the liquid crystal panel 20 is of an IPS (In Plane Switching: lateral electric field switching) type, to discharge charges on a surface of the touch-panel-7-side glass substrate 2, there has been generally adopted a method in which a conductive film (ITO (Indium Tin Oxide) film) formed on an upper surface of the glass substrate 2 and a ground electrode formed on an upper surface of the glass substrate 3 are directly connected with each other using a conductive resin 14 such as an epoxy resin in which silver powder is impregnated. However, the formation of the thin film made of the conductive resin 14 on the glass substrate 2 by coating is not easy and hence, there exists a possibility that the touch panel 7 is brought into contact with the conductive resin 14 as shown in FIG. 16. Further, irregularities of a resistance value is large with respect to the conductive resin 14, and a DC resistance component of the conductive resin 14 may exceed several MΩ. Particularly when the touch panel 7 is an electrostatic-capacitance-type touch panel, there exists a possibility that charges on a surface of the glass substrate 2 cannot be efficiently discharged.

The present invention has been made to overcome the above-mentioned drawbacks, and it is a first object of the present invention to provide a liquid crystal display which can reliably adhere an elastic layer which is liable to warp easily to a rigid layer.

It is a second object of the present invention to provide a liquid crystal display which prevents a touch panel adhered to a liquid crystal panel by way of an adhesive layer and a semiconductor element mounted on the liquid crystal panel from coming into contact with each other.

It is a third object of the present invention to provide a liquid crystal display which can prevent breaking of a semiconductor element due to bumping of one edge of the touch panel adhered to the liquid crystal panel by way of the adhesive layer into an upper surface of a semiconductor element mounted on the liquid crystal panel by an external force.

It is a fourth object of the present invention to provide a liquid crystal display which can efficiently discharge charges on an IPS-type liquid crystal panel.

(1) According to one aspect of the present invention, the liquid crystal display according to the present invention includes an elastic layer, a rigid layer and an adhesive sheet for adhering the elastic layer to the rigid layer.

According to one aspect of the present invention described above, the elastic layer which is liable to warp easily can be adhered to the rigid layer.

According to one mode of the present invention, the elastic layer is formed of an elastic front window, and the rigid layer is formed of a rigid touch panel. According to this mode, it is possible to adhere the elastic front window to the rigid touch panel.

According to one mode of the present invention, the elastic layer is formed of an elastic touch panel, and the rigid layer is formed of a rigid liquid crystal panel. According to this mode, it is possible to adhere the elastic touch panel to the rigid liquid crystal panel.

In this mode, the liquid crystal display may further include an elastic front window and another adhesive sheet which adheres the elastic front window to the elastic touch panel adhered to the rigid liquid crystal panel by way of the adhesive sheet. Further, the liquid crystal display may further include the rigid front window and an ultraviolet-curing adhesive material which adheres the rigid front window to the elastic touch panel adhered to the rigid liquid crystal panel by way of the adhesive sheet.

According to one mode of the present invention, the elastic layer is formed of an elastic touch panel, and the rigid layer is formed of a rigid front window. According to this mode, it is possible to adhere the elastic touch panel to the rigid front window.

In this mode, the liquid crystal display may further include the rigid liquid crystal panel and an ultraviolet-curing adhesive material which adheres the rigid liquid crystal panel to the elastic touch panel adhered to the rigid front window by way of the adhesive sheet.

Further, according to one mode of the present invention, the adhesive sheet is a transparent sheet member, and a transparent adhesive material is applied to both surfaces of the sheet member by coating.

(2) According to another aspect of the present invention, there is provided a liquid crystal display which includes: a first substrate; a second substrate which is arranged to face the first substrate in an opposed manner such that a liquid crystal layer is sandwiched between the first substrate and the second substrate; a semiconductor element which is mounted on a region of a liquid-crystal-layer-side surface of the first substrate excluding a region where the first substrate faces the second substrate; a polarizer which is arranged on the second substrate; a touch panel which is adhered to the polarizer by way of a first adhesive layer, and allows one edge thereof to face at least a portion of the region where the semiconductor element is mounted; and a front window which is adhered to the touch panel by way of a second adhesive layer, wherein a thickness of the semiconductor element is smaller than a sum of a thickness of the polarizer and a thickness of the second substrate.

According to another aspect of the present invention, it is possible to prevent the touch panel which is adhered to the liquid crystal panel including the first substrate and the second substrate which sandwich the liquid crystal layer therebetween and the polarizer by way of the adhesive layer from coming into contact with the semiconductor element which is mounted on the liquid crystal panel. Here, the thickness of the semiconductor element may be smaller than a sum of one half of the thickness of the polarizer and the thickness of the second substrate.

According to one mode of the present invention, the thickness of the semiconductor element is larger than the thickness of the second substrate. According to this mode, it is possible to prevent the touch panel and the semiconductor element from coming into contact with each other while ensuring a strength (for example, crack resistance) of the semiconductor element in the thickness direction.

(3) According to still another aspect of the present invention, there is provided a liquid crystal display which includes: a first substrate; a second substrate which is arranged to face the first substrate in an opposed manner such that a liquid crystal layer is sandwiched between the first substrate and the second substrate; a semiconductor element which is mounted on a region of a liquid-crystal-layer-side surface of the first substrate excluding a region where the first substrate faces the second substrate; a polarizer which is arranged on the second substrate; a touch panel which is adhered to the polarizer by way of a first adhesive layer; and a front window which is adhered to the touch panel by way of a second adhesive layer, wherein one edge of the touch panel projects or overhangs from a region which faces the semiconductor element in an opposed manner so as to prevent the one edge of the touch panel from coming into contact with an upper surface of the semiconductor element when the one edge of the touch panel is displaced in the first substrate direction.

According to still another aspect of the present invention, it is possible to prevent one edge of the touch panel which is adhered to the liquid crystal panel including the first substrate and the second substrate which sandwich the liquid crystal layer therebetween and the polarizer by way of the adhesive layer from bumping into the upper surface of the semiconductor element mounted on the liquid crystal panel by an external force and breaking the semiconductor element.

(4) According to a further aspect of the present invention, there is provided a liquid crystal display which includes: an IPS type liquid crystal panel which includes a first substrate on which a plurality of pairs of electrodes each of which consists of a pixel electrode and a counter electrode are formed, a second substrate which is arranged to face the first substrate in an opposed manner such that a liquid crystal layer is sandwiched between the first substrate and the second substrate, and a polarizer which is arranged on the second substrate; a touch panel which is adhered to the polarizer by way of an adhesive layer; and a conductive tape which electrically connects a ground electrode which is formed on a region of a liquid-crystal-layer-side surface of the first substrate excluding a region where the first substrate faces the second substrate and a conductive film formed on the second substrate with each other.

According to the further aspect of the present invention, it is possible to efficiently discharge charges in the IPS-type liquid crystal panel.

According to one mode of the present invention, a thickness of the conductive tape is smaller than a thickness of the polarizer. According to this mode, it is possible to reduce a thickness of the liquid crystal display.

According to one mode of the present invention, the conductive tape is adhered to the ground electrode and the conductive film respectively by thermocompression bonding.

According to one mode of the present invention, the touch panel is an electrostatic-capacitance-type touch panel.

BRIEF DESCRIPTION OF THE DRAWINGS

FIG. 1A to FIG. 1D are four schematic cross-sectional views showing representative examples of a mobile-phone-use liquid crystal display module according to an embodiment 1 of the present invention;

FIG. 12 is a cross-sectional view of the mobile-phone-use liquid crystal display module shown in FIG. 10 taken along a line XII-XII;

DESCRIPTION OF THE PREFERRED EMBODIMENT

Figure 2:
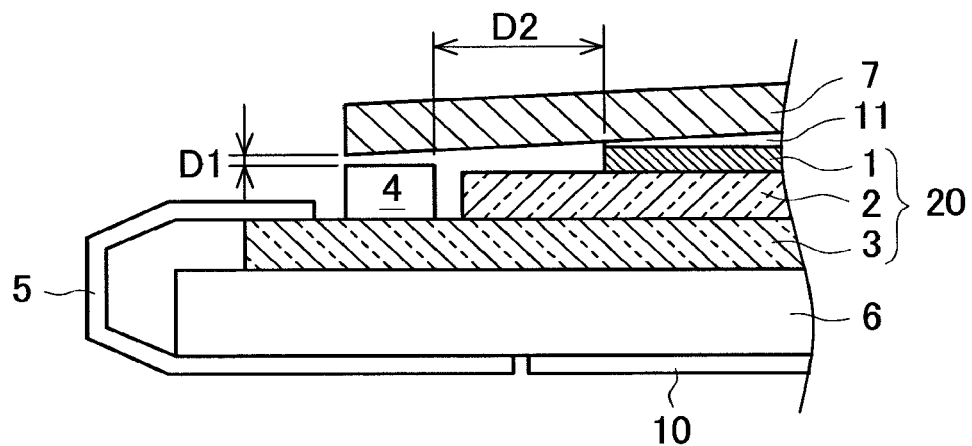
FIG. 2 is a partially cross-sectional view of a mobile-phone-use liquid crystal display module according to an embodiment 2 of the present invention.

Hereinafter, embodiments of the present invention are explained in detail in conjunction with drawings. Here, in the drawings, identical constitutional elements are given same numerals or symbols and their repeated explanation is omitted.

[Embodiment 1]

FIG. 1A to FIG. 1D are four schematic cross-sectional views showing representative examples of a mobile-phone-use liquid crystal display module according to an embodiment 1 of the present invention.

The mobile-phone-use liquid crystal display module shown in FIG. 1A is formed of a liquid crystal display which is constituted by stacking a liquid crystal panel (rigid layer) 20 which is formed of two glass substrates with a liquid crystal layer sandwiched therebetween, an electrostatic-capacitance-type touch panel (rigid layer) 7 which is formed of a glass substrate, for example, and a front window (elastic layer) 23 made of an acrylic resin, for example, in this order.

Here, in the same manner as a technique adopted by the related art, the rigid touch panel 7 is adhered to the rigid liquid crystal panel 20 by way of an ultraviolet-curing adhesive material 11. Further, the elastic front window 23 is adhered to the rigid touch panel 7 by way of an adhesive sheet 30 formed of a transparent sheet member which has both surfaces thereof covered with a transparent adhesive material by coating.

Different from an ultraviolet-curing adhesive material which exhibits a different adhesive strength between before and after the radiation of ultraviolet rays, the adhesive sheet 30 originally possesses an adhesive strength sufficient to adhere an elastic layer to a rigid layer while straightening the elastic layer having a warp. Accordingly, the elastic front window 23 which is liable to warp easily can be adhered to the rigid touch panel 7.

The mobile-phone-use liquid crystal display module shown in FIG. 1B is formed of a liquid crystal display which is constituted by stacking a liquid crystal panel (rigid layer) 20 which is formed of two glass substrates with a liquid crystal layer sandwiched therebetween, a touch panel (elastic layer) 17 which is made of a resin material, for example, and a front window (elastic layer) 23 made of an acrylic resin, for example, in this order.

Here, the elastic touch panel 17 is adhered to the rigid liquid crystal panel 20 by way of an adhesive sheet 30 and, then, the elastic front window 23 is also adhered to the elastic touch panel 17 which is adhered to the rigid liquid crystal panel 20 by way of the adhesive sheet 30.

Due to such a constitution, the elastic touch panel 17 which is liable to warp easily can be adhered to the rigid liquid crystal panel 20 and, at the same time, the elastic front window 23 which is liable to warp easily can be adhered to the elastic touch panel 17 which is adhered to the rigid liquid crystal panel 20.

Mobile-phone-use liquid crystal display modules respectively shown in FIG. 1C and FIG. 1D are formed of a liquid crystal display. The liquid crystal display is constituted by stacking a liquid crystal panel (rigid layer) 20 which is formed of two glass substrates with a liquid crystal layer sandwiched therebetween, a touch panel (elastic layer) 17 which is made of a resin material, for example, and a front window (rigid layer) 13 which is made of reinforced glass, for example, in this order.

With respect to the mobile-phone-use liquid crystal display module shown in FIG. 1C, the elastic touch panel 17 is adhered to the rigid liquid crystal panel 20 by way of an adhesive sheet 30 and, thereafter, the rigid front window 13 is adhered to the elastic touch panel 17 which is adhered to the rigid liquid crystal panel 20 by way of an ultraviolet-curing adhesive material 12. Due to such a constitution, the elastic touch panel 17 also becomes a rigid layer due to the adhesion of the elastic touch panel 17 to the rigid liquid crystal panel 20. Accordingly, it is possible to use the ultraviolet-curing adhesive material 12 for adhering the touch panel 17 which becomes the rigid layer and the rigid front window 13 to each other.

On the other hand, in the mobile-phone-use liquid crystal display module shown in FIG. 1D, the elastic touch panel 17 is adhered to the rigid front window 13 by way of an adhesive sheet 30 and, thereafter, the rigid liquid crystal panel 20 is adhered to the elastic touch panel 17 which is adhered to the rigid front window 13 by way of an ultraviolet-curing adhesive material 11. Due to such a constitution, the elastic touch panel 17 also becomes a rigid layer due to the adhesion of the elastic touch panel 17 to the rigid front window 13. Accordingly, it is possible to use the ultraviolet-curing adhesive material 11 for adhering the touch panel 17 which becomes the rigid layer and the rigid liquid crystal panel 20 to each other.

Due to the above-mentioned constitution, the touch panel 17 which is liable to warp easily can be adhered to the rigid liquid crystal panel 20 and the rigid front window 13 respectively.

That is, according to the respective mobile-phone-use liquid crystal display modules of the embodiment 1, the elastic layer which is liable to warp easily can be reliably adhered to the rigid layer using the adhesive sheet 30.

The present invention is not limited to the mobile-phone-use liquid crystal display modules shown in FIG. 1A to FIG. 1D having the "three-layered hybrid structure". That is, the present invention is widely applicable to almost all types of liquid crystal displays provided that the display device includes the rigid layer and the elastic layer adhered to the rigid layer.

[Embodiment 2]

FIG. 2 is a partially cross-sectional view of a mobile-phone-use liquid crystal display module according to an embodiment 2 of the present invention.

As shown in FIG. 2, the mobile-phone-use liquid crystal display module according to the embodiment 2 is formed of a liquid crystal display having the "three-layered hybrid structure". The liquid crystal display includes a liquid crystal panel 20 which is constituted of glass substrates 2, 3 with a liquid crystal layer not shown in the drawing sandwiched therebetween and a polarizer 1 (thickness being set to approximately 0.1 mm to 0.14 mm) arranged on the glass substrate 2, a semiconductor chip 4 which is mounted on the glass substrate 3, a liquid-crystal-panel-use FPC 5 which is electrically connected to the semiconductor chip 4, a resin mold 6 which supports the liquid crystal panel 20, a reflection sheet 10, a touch panel 7 which is adhered to the polarizer 1 by way of an adhesive layer (ultraviolet-curing adhesive material) 11 and is larger than the polarizer 1 in size, a touch-panel-use FPC 8 not shown in the drawing, and a front window 9 not shown in the drawing which is adhered to the touch panel 7 by way of an adhesive layer (ultraviolet-curing adhesive material) 12 not shown in the drawing.

The glass substrate 2 is arranged to face the glass substrate 3 in an opposed manner with the liquid crystal layer sandwiched therebetween. Pixel electrodes for applying an electric field to the liquid crystal layer are formed on a liquid-crystal-layer-side surface of the glass substrate 2 or the glass substrate 3, and counter electrodes which face the pixel electrodes are formed on a liquid-crystal-layer-side surface of the glass substrate 3.

The semiconductor chip 4 is mounted on a region of the liquid-crystal-layer-side surface of the glass substrate 3 excluding a region of the surface which faces the glass substrate 2 in an opposed manner, and drives the liquid crystal panel 20 by controlling potentials which are applied to the pixel electrode and the counter electrode respectively.

The touch panel 7 is adhered to the polarizer 1 by way of the adhesive layer 11, and one edge (semiconductor-chip-4-side edge) of the touch panel 7 faces at least a portion of a region formed on the glass substrate 3 on which the semiconductor chip 4 is mounted.

In this embodiment, a thickness of the semiconductor chip 4 is set smaller than a sum of a thickness of the polarizer 1 and a thickness of the glass substrate 2. Particularly, it is preferable that the thickness of the semiconductor chip 4 is set smaller than a sum of one half of thickness of the polarizer 1 and a thickness of the glass substrate 2. To be more specific, when the thickness of the polarizer 1 is 0.12 mm and the thickness of the glass substrate 2 is 0.2 mm, the thickness of the semiconductor chip 4 is less than 0.26 mm. Further, when the thickness of the polarizer 1 is 0.12 mm and the thickness of the glass substrate 2 is 0.25 mm, the thickness of the semiconductor chip 4 is less than 0.31 mm.

Accordingly, as shown in FIG. 2, even when the touch panel 7 is adhered to the liquid crystal panel 20 in an inclined manner by way of the adhesive layer 11, a distance D1 between one edge of the touch panel 7 and an upper surface of the semiconductor chip 4 is set larger than 0 and hence, it is possible to prevent the touch panel 7 and the semiconductor chip 4 from coming into contact with each other.

Further, the thickness of the semiconductor chip 4 may be set larger than the thickness of the glass substrate 2. Due to such a constitution, it is possible to prevent the touch panel 7 and the semiconductor chip 4 from coming into contact with each other while ensuring a strength (for example, crack resistance) of the semiconductor chip 4 in the thickness direction.

Here, the thickness of the semiconductor chip 4 may be decided based on a distance D2 between the adhesive layer 11 and the semiconductor chip 4 in the lateral direction (generally, being set to approximately 2.5 mm), a longitudinal length and an elastic modulus of the touch panel 7, a thickness of the adhesive layer 11 and the like.

That is, according to the mobile-phone-use liquid crystal display module of the embodiment 2, it is possible to prevent the touch panel 7 which is adhered to the liquid crystal panel 20 by way of the adhesive layer 11 and the semiconductor chip 4 which is mounted on the glass substrate 3 of the liquid crystal panel 20 from coming into contact with each other.

[Embodiment 3]

Figure 3:
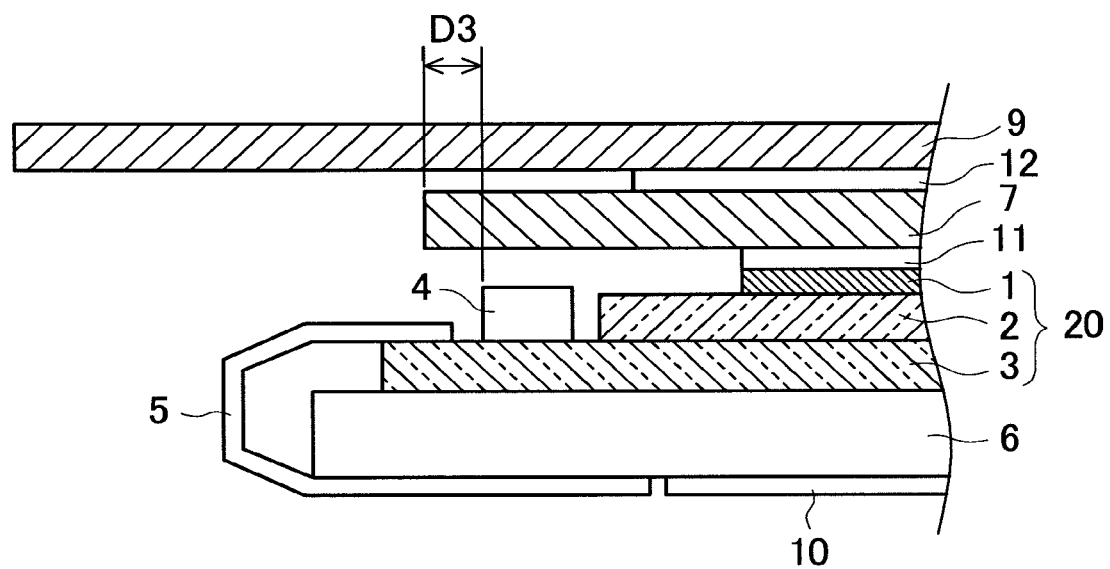
FIG. 3 is a partially cross-sectional view of a mobile-phone-use liquid crystal display module according to an embodiment 3 of the present invention.

FIG. 3 is a partially cross-sectional view of a mobile-phone-use liquid crystal display module according to an embodiment 3 of the present invention.

As shown in FIG. 3, the mobile-phone-use liquid crystal display module according to the embodiment 3 is formed of a liquid crystal display having the "three-layered hybrid structure". The liquid crystal display includes a liquid crystal panel 20 which is constituted of glass substrates 2, 3 with a liquid crystal layer not shown in the drawing sandwiched therebetween and a polarizer 1 arranged on the glass substrate 2, a semiconductor chip 4 which is mounted on the glass substrate 3, a liquid-crystal-panel-use FPC 5 which is electrically connected to the semiconductor chip 4, a resin mold 6 which supports the liquid crystal panel 20, a reflection sheet 10, a touch panel 7 which is adhered to the polarizer 1 by way of an adhesive layer (ultraviolet-curing adhesive material) 11 and is larger than the polarizer 1 in size, a touch-panel-use FPC 8 not shown in the drawing, and a front window 9 which is adhered to the touch panel 7 by way of an adhesive layer (ultraviolet-curing adhesive material) 12 and is larger than the touch panel 7 in size.

The glass substrate 2 is arranged to face the glass substrate 3 in an opposed manner with the liquid crystal layer sandwiched therebetween. Pixel electrodes for applying an electric field to the liquid crystal layer are formed on a liquid-crystal-layer-side surface of the glass substrate 2 or the glass substrate 3, and counter electrodes which face the pixel electrodes are formed on a liquid-crystal-layer-side surface of the glass substrate 3.

The semiconductor chip 4 is mounted on a region of the liquid-crystal-layer-side surface of the glass substrate 3 excluding a region of the surface which faces the glass substrate 2 in an opposed manner, and drives the liquid crystal panel 20 by controlling potentials which are applied to the pixel electrodes and the counter electrodes respectively. A thickness of the semiconductor chip 4 is set smaller than a sum of a thickness of the polarizer 1 and a thickness of the glass substrate 2.

The touch panel 7 is adhered to the polarizer 1 by way of the adhesive layer 11.

In this embodiment, for preventing one edge (semiconductor-chip-4-side edge) of the touch panel 7 from being brought into contact with an upper surface of the semiconductor chip 4 when the one edge of the touch panel 7 is displaced in the direction toward the glass substrate 3, the one edge of the touch panel 7 projects or overhangs from a region which faces the semiconductor chip 4 in an opposed manner by a length of D3 (D3>0).

Due to such a constitution, even when one edge of the touch panel 7 is largely displaced in the direction toward the glass substrate 3 due to the application of pressure to an edge portion of the front window 9, the generation of the instantaneous deflection of the front window 9 or the like, the touch panel 7 is brought into surface contact with the upper surface of the semiconductor chip 4.

That is, according to the mobile-phone-use liquid crystal display module of the embodiment 3, it is possible to prevent the semiconductor chip 4 from being broken due to bumping of one edge of the touch panel 7 which is adhered to the liquid crystal panel 20 by way of the adhesive layer 11 into an upper surface of the semiconductor chip 4 which is mounted on the glass substrate 3 of the liquid crystal panel 20 by an external force.

[Embodiment 4]

Figure 4:
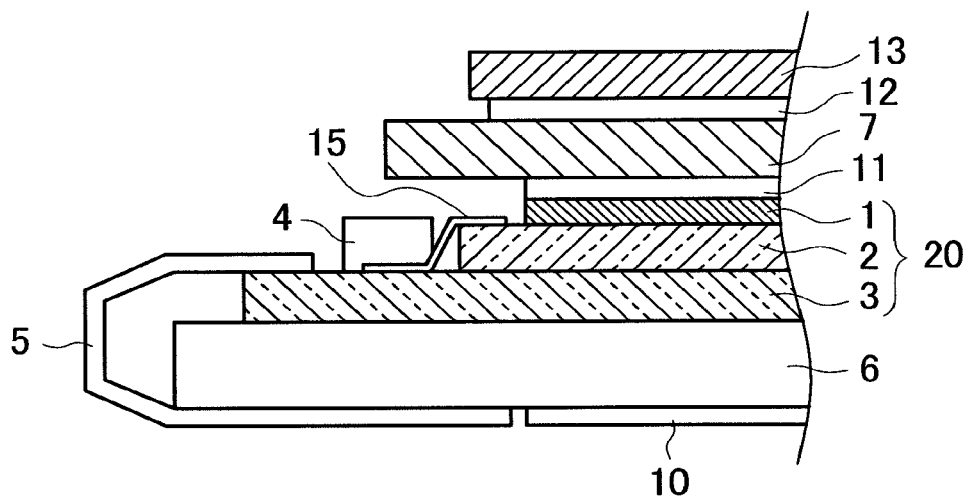
FIG. 4 is a partially cross-sectional view of a mobile-phone-use liquid crystal display module according to an embodiment 4 of the present invention.
Figure 5:
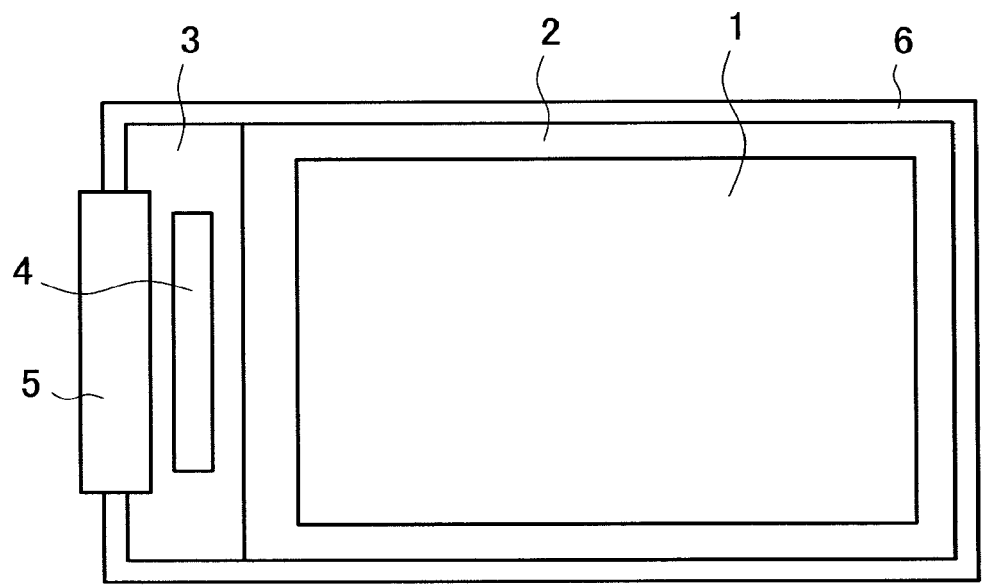
FIG. 5 is a view showing a mobile-phone-use liquid crystal display module of the related art in a state where a polarizer is exposed (a state before a touch panel and a front window are adhered to each other)
Figure 6:
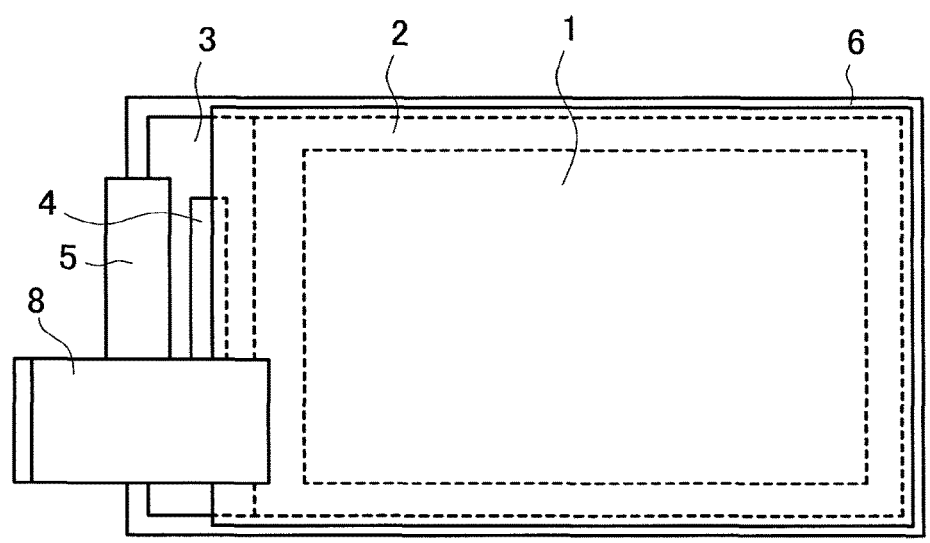
FIG. 6 is a view showing a state in which the touch panel is adhered to the polarizer shown in FIG. 5 (a state before the front window is adhered)
Figure 7:
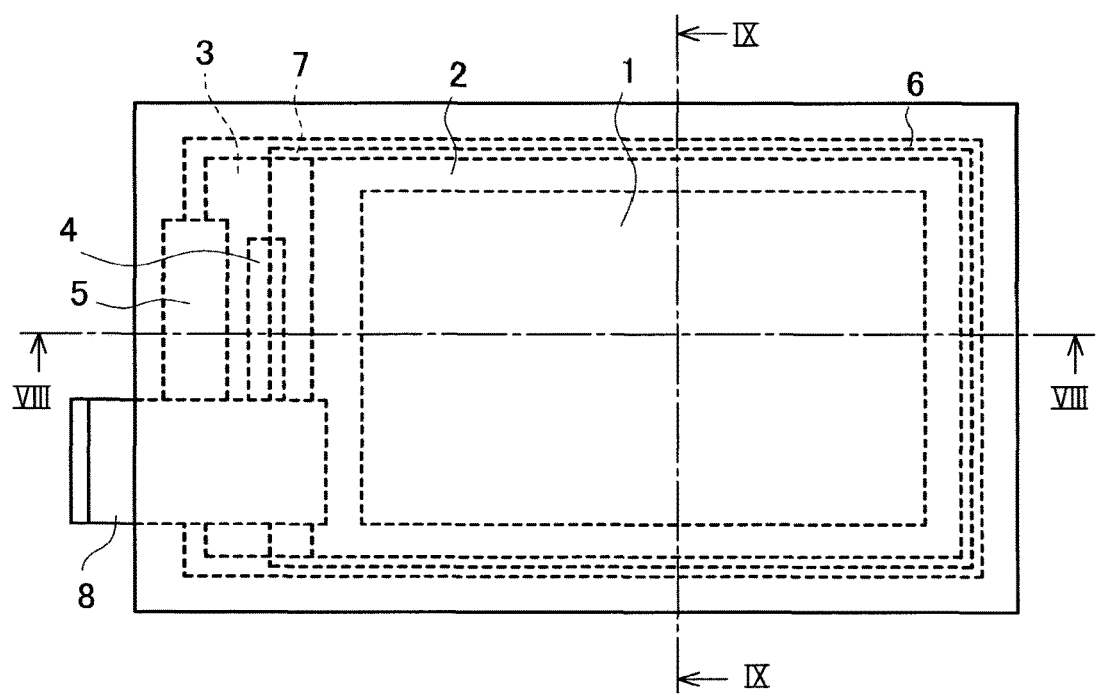
FIG. 7 is a top plan view of the mobile-phone-use liquid crystal display module shown in FIG. 6 which has the three-layered hybrid structure in which the front window is further adhered to the touch panel.
Figure 8:
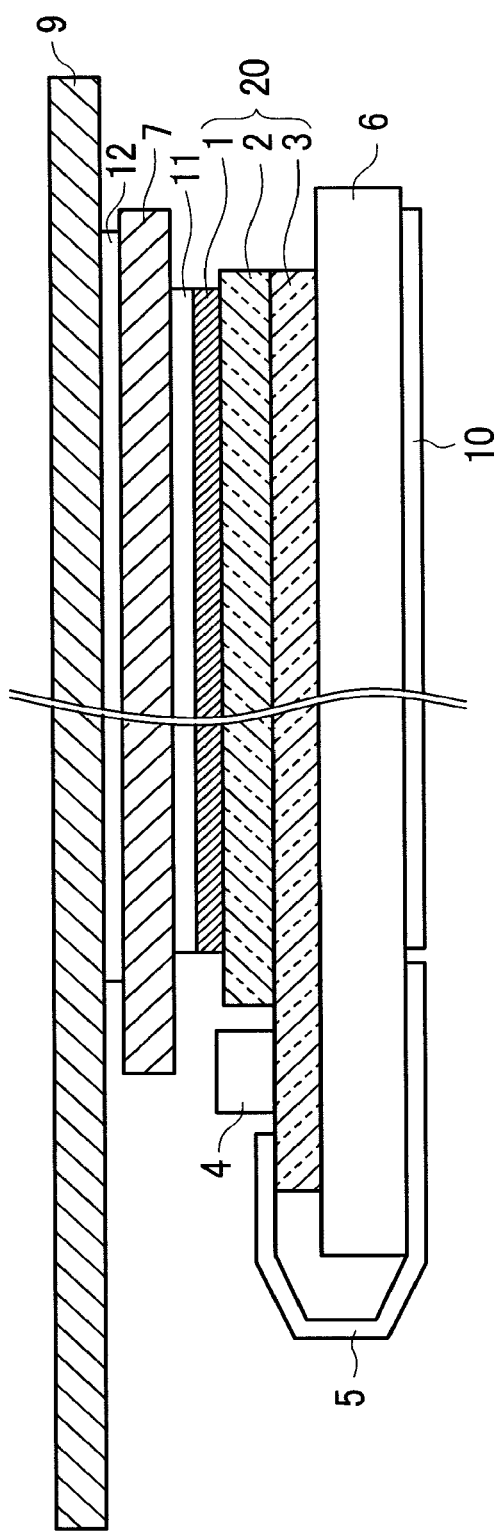
FIG. 8 is a cross-sectional view of the mobile-phone-use liquid crystal display module shown in FIG. 6 taken along a line VIII-VIII.
Figure 9:
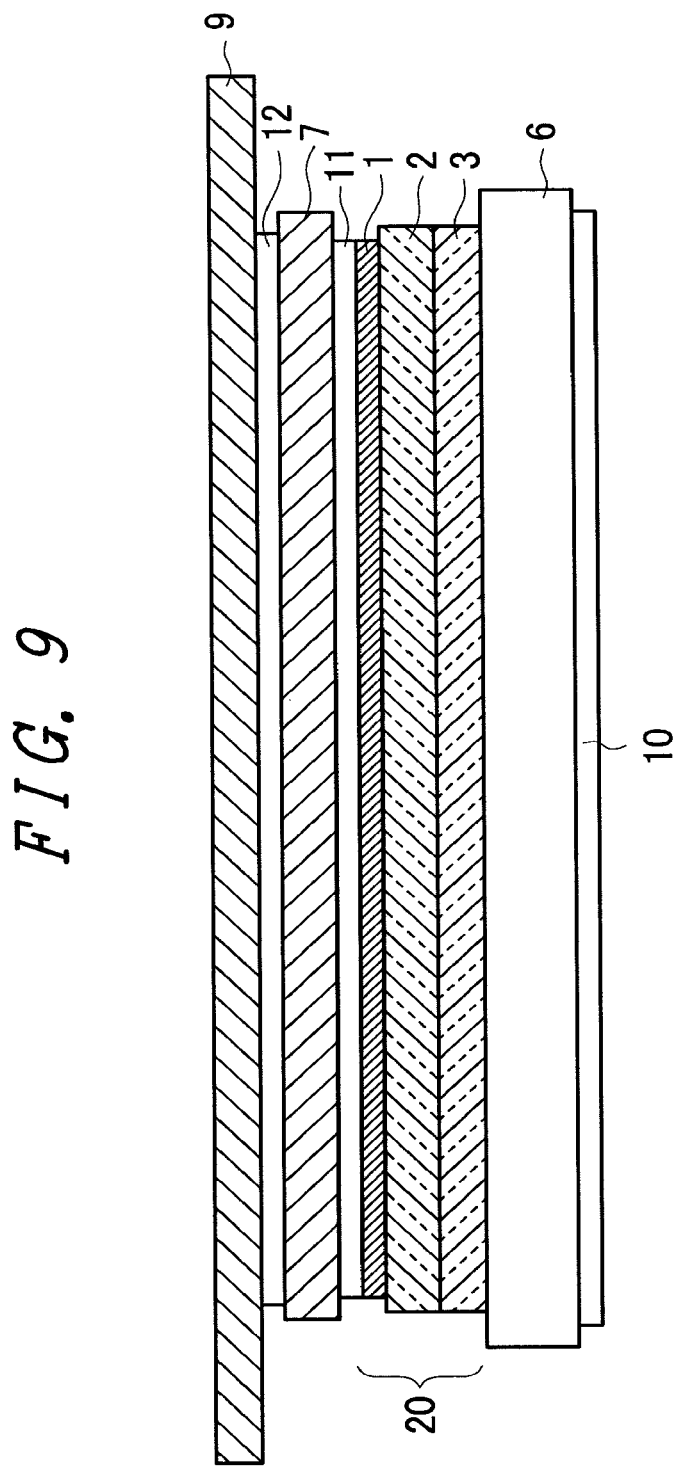
FIG. 9 is a cross-sectional view of the mobile-phone-use liquid crystal display module shown in FIG. 6 taken along a line IX-IX.
Figure 10:
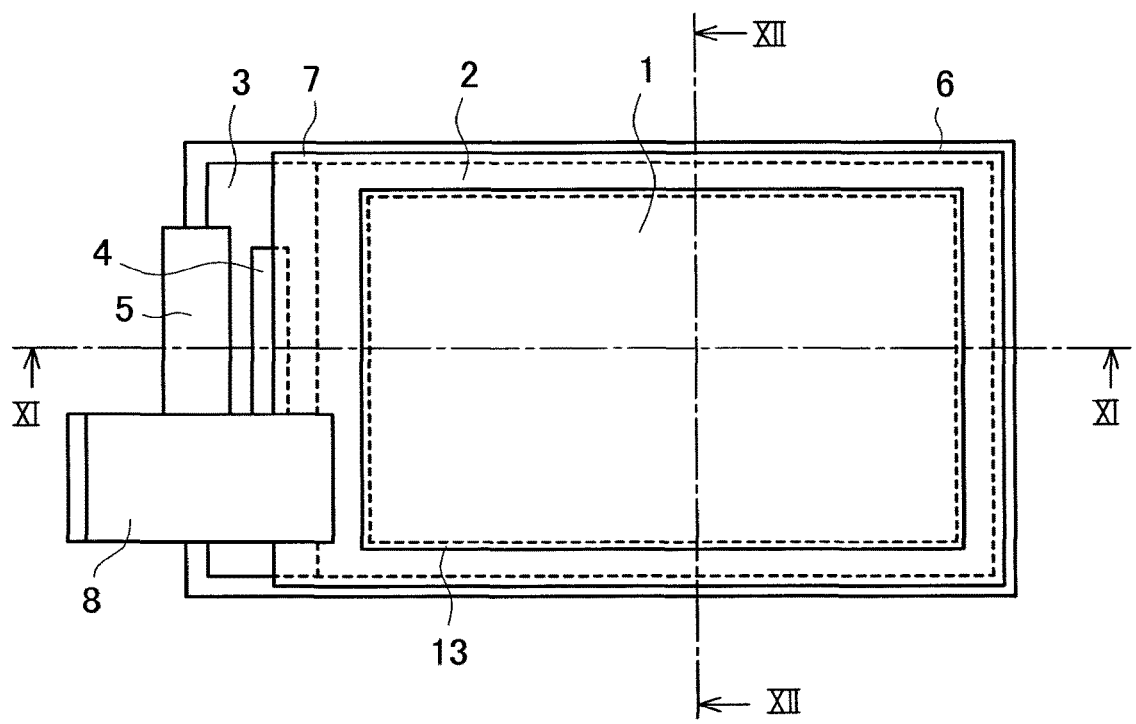
FIG. 10 is a top plan view of another mobile-phone-use liquid crystal display module of the related art having the three-layered hybrid structure.
Figure 11:
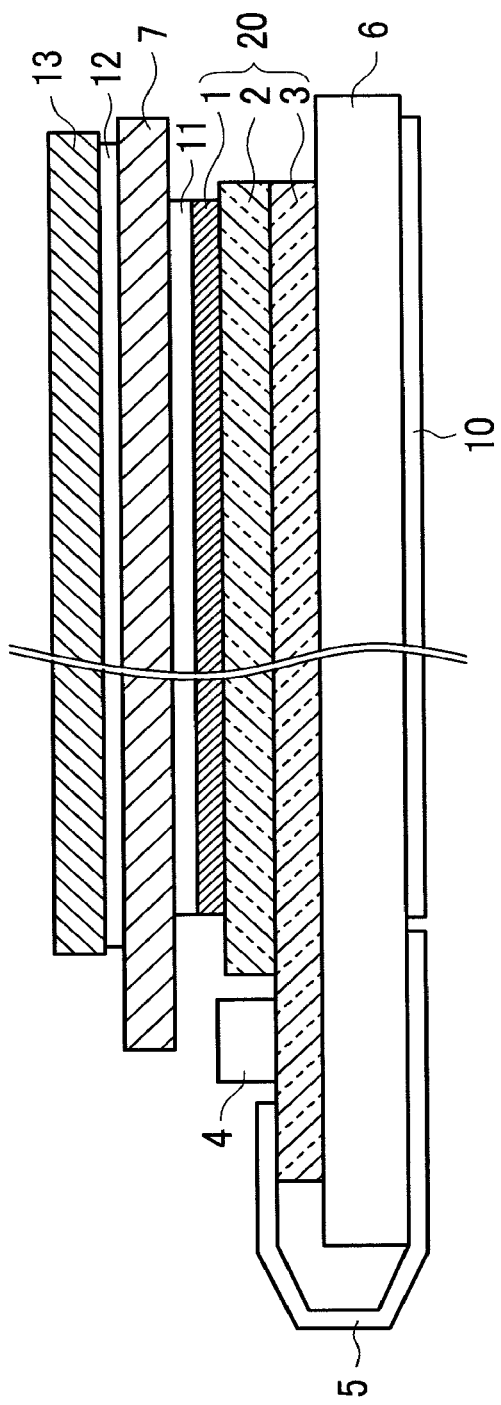
FIG. 11 is a cross-sectional view of the mobile-phone-use liquid crystal display module shown in FIG. 10 taken along a line XI-XI.
Figure 13A:
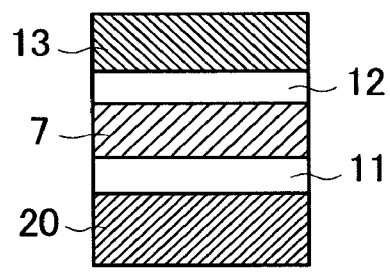
FIG. 13A and FIG. 13B are views for explaining a problem of the mobile-phone-use liquid crystal display module of the related art.
Figure 13B:
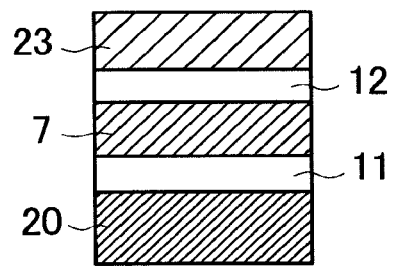
Figure 14:
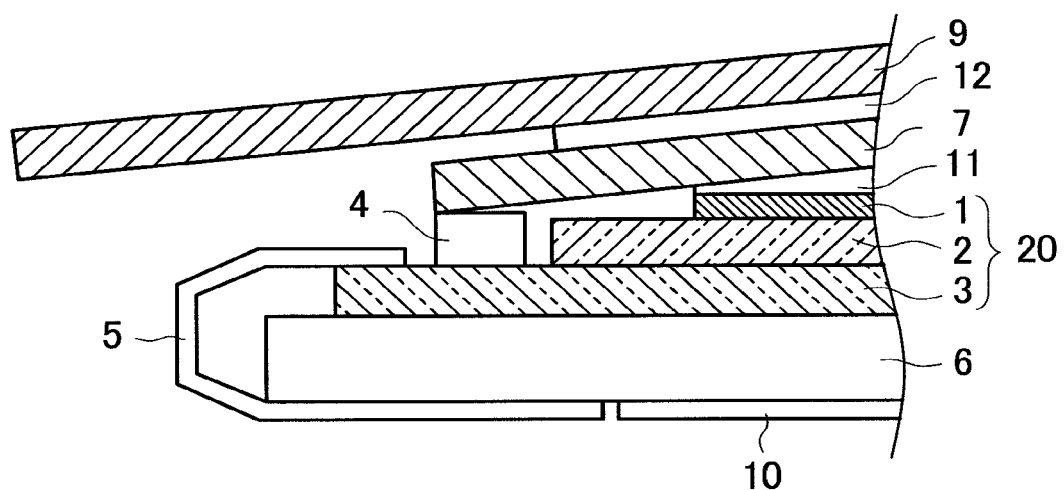
FIG. 14 is a view for explaining a problem of the mobile-phone-use liquid crystal display module of the related art.
Figure 15:
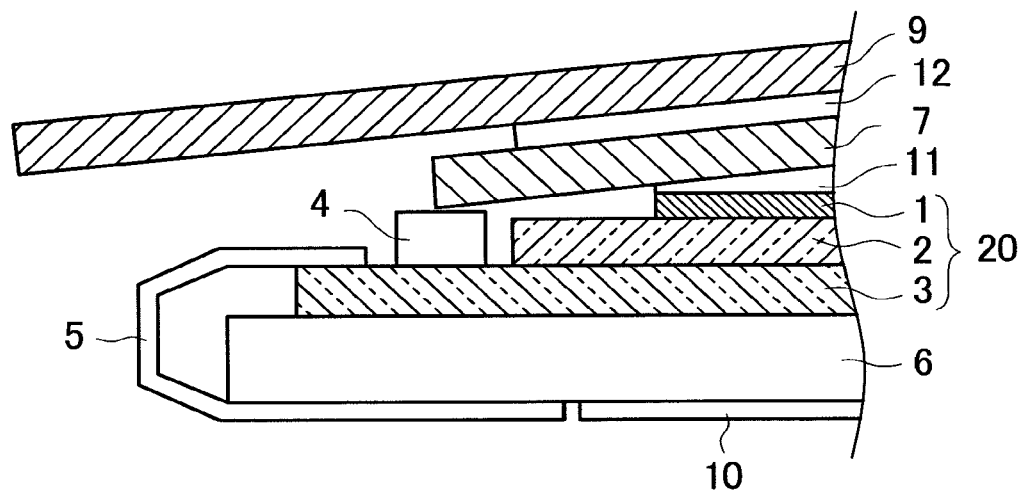
FIG. 15 is a view for explaining a problem of the mobile-phone-use liquid crystal display module of the related art.
Figure 16:
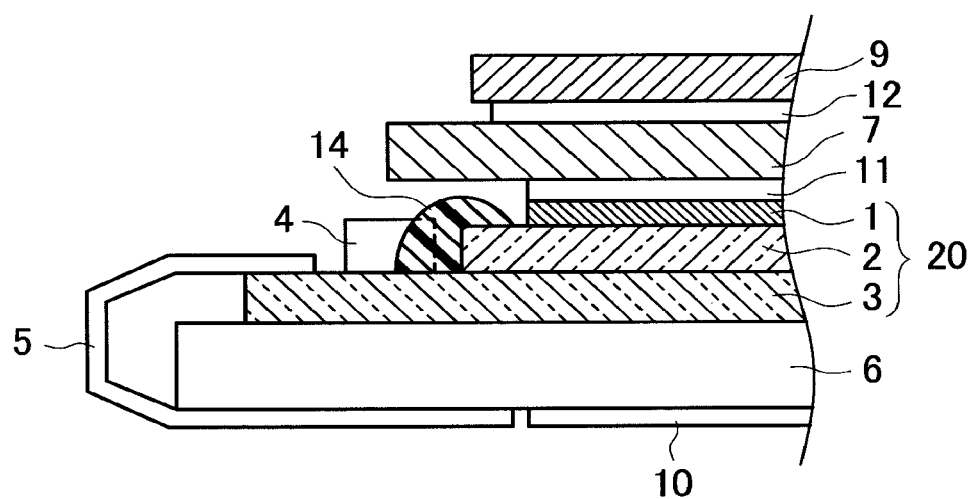
FIG. 16 is a view for explaining a problem of the mobile-phone-use liquid crystal display module of the related art.

FIG. 4 is a partially cross-sectional view of a mobile-phone-use liquid crystal display module according to an embodiment 4 of the present invention.

As shown in FIG. 4, the mobile-phone-use liquid crystal display module according to the embodiment 4 is formed of a liquid crystal display having the "three-layered hybrid structure". The liquid crystal display includes an IPS-type liquid crystal panel 20 which is constituted of glass substrates 2, 3 with a liquid crystal layer not shown in the drawing sandwiched therebetween and a polarizer 1 arranged on the glass substrate 2, a semiconductor chip 4 which is mounted on the glass substrate 3, a liquid-crystal-panel-use FPC 5 which is electrically connected to the semiconductor chip 4, a resin mold 6 which supports the liquid crystal panel 20, a reflection sheet 10, an electrostatic-capacitance-type touch panel 7 which is adhered to the polarizer 1 by way of an adhesive layer (ultraviolet-curing adhesive material) 11, a touch-panel-use FPC 8 not shown in the drawing, a front window 13 which is adhered to the touch panel 7 by way of an adhesive layer (ultraviolet-curing adhesive material) 12, and a thermocompression bonding type conductive tape 15 (for example, having a thickness of 80 µm or less) which has both edges thereof connected to the glass substrates 2, 3 respectively.

The glass substrate 2 is arranged to face the glass substrate 3 in an opposed manner with the liquid crystal layer sandwiched therebetween. An ITO film which is connected to a ground potential is formed on an upper surface of the glass substrate 2.

On a liquid-crystal-layer-side surface of the glass substrate 3, a transparent conductive film which includes a plurality of pairs of pixel electrodes and counter electrodes is formed. A lateral electric field with respect to the glass substrate 3 is applied to the liquid crystal layer via the transparent conductive film. Further, on a region of the liquid-crystal-layer-side surface of the glass substrate 3 excluding a region of the surface which faces the glass substrate 2 in an opposed manner, a pad-shaped ground electrode which is connected to a ground line of the liquid-crystal-panel-use FPC 5 is formed.

The semiconductor chip 4 is mounted on the region of the liquid-crystal-layer-side surface of the glass substrate 3 excluding the region of the surface which faces the glass substrate 2 in an opposed manner, and the semiconductor chip 4 drives the liquid crystal panel 20 by controlling potentials applied to the pixel electrodes and the counter electrodes formed on the glass substrate 3 respectively.

The touch panel 7 is adhered to the polarizer 1 by way of the adhesive layer 11.

In this embodiment, one end of the conductive tape 15 is adhered to the ground electrode formed on the glass substrate 3 by thermocompression bonding, and the other end of the conductive tape 15 is adhered to the ITO film formed on the upper surface of the glass substrate 2 by thermocompression bonding. The conductive tape 15 has a thickness smaller than a thickness of a conductive resin film which has been conventionally used as a discharge path and hence, there is no possibility that the touch panel 7 is brought into contact with the conductive tape 15. Here, a thickness of the conductive tape 15 may be set smaller than a thickness of the polarizer 1. Due to such a constitution, it is possible to reduce a thickness of the mobile-phone-use liquid crystal display module as a whole.

The thermocompression-bonding-type conductive tape 15 exhibits small resistance irregularities, and a DC resistance component of the resistance is approximately several kΩ. Accordingly, compared to the conductive resin film which has been conventionally used as the discharge path, the discharge efficiency of charges on the surface of the glass substrate 2 can be enhanced.

That is, according to the mobile-phone-use liquid crystal display module of the embodiment 4, it is possible to efficiently discharge the charges on the IPS-type liquid crystal panel 20 and, at the same time, the thickness of the module can be decreased as a whole.

According to the above-mentioned embodiments 1 to 4, it is possible to overcome the plurality of drawbacks which the mobile-phone-use liquid crystal display module of the related art has.

The present invention is not limited to the above-mentioned embodiments 1 to 4. For example, the present invention is not limited to the mobile-phone-use liquid crystal display module and is widely applicable to a liquid crystal display which is mounted on a portable gaming machine, a digital camera, a PDA or the like.

What is claimed is:

1. A display device comprising:
   a display panel having a first substrate, a second substrate, a polarizer, and a semiconductor chip,
   a touch panel being on the display panel and,
   a first adhesive material disposed between the display panel and the touch panel,
   wherein the touch panel and the polarizer of the display panel are adhered by the first adhesive material,
   wherein the semiconductor chip mounts on an edge region of the first substrate,
   wherein the second substrate and the polarizer are stacked on the first substrate in this order and are in contact with each other,
   wherein the touch panel has a first portion that does not overlap with the polarizer,
   wherein the first portion overlaps with the semiconductor chip, and
   wherein a height of a top surface of the semiconductor chip from the first substrate is smaller than a height of a top surface of the polarizer from the first substrate.

2. The display device according to the claim 1 further comprising:
   a front cover on the touch panel,
   wherein the front window is including a glass.

3. The display device according to the claim 1 further comprising:
   a front cover on the touch panel,
   wherein the front window is including an acryl material.

4. The display device according to the claim 1;
   wherein the display panel has the second substrate facing the first substrate.

5. The display device according to the claim 4;
   wherein the display panel includes a liquid crystal between the first substrate and the second substrate.

6. The display device according to the claim 4;
   wherein the semiconductor chip is thicker than the second substrate.

7. The display device according to the claim 4;
   wherein the semiconductor chip is thinner than a sum of one half of the polarizer and the second substrate.

8. The display device according to the claim 4;
   wherein the display panel includes a conductive film formed on the second substrate, and wherein the conductive material electrically connecting the conductive film to a ground electrode.

9. The display device according to the claim 8;
   wherein the conductive film is Indium Tin Oxide.

10. The display device according to the claim 8;
    wherein the ground electrode is formed on the edge region.

11. The display device according to the claim 8;
    wherein the conductive material is a conductive tape.

12. The display device according to the claim 11;
    wherein the ground electrode is formed on the edge region.

13. The display device according to the claim 11;
    wherein the conductive tape is thinner than the polarizer.

14. The display device according to the claim 11;
    wherein the touch panel covers the conductive film in a top plan view.

15. The display device according to the claim 11;
    the conductive tape adheres thermocompressively to the conductive film.

16. The display device according to the claim 1 further comprising:
    a front window on the touch panel,
    wherein the area of the front window is larger than the area of the touch panel.

* * * * *